United States Patent [19]
Paulsen

[11] Patent Number: 5,706,221
[45] Date of Patent: Jan. 6, 1998

[54] MEHTOD AND APPARATUS FOR RECOVERING DIGITAL DATA FROM BASEBAND ANALOG SIGNAL

[75] Inventor: David L. Paulsen, Mountain View, Calif.

[73] Assignee: Metricom, Inc., Los Gatos, Calif.

[21] Appl. No.: 647,613

[22] Filed: May 13, 1996

[51] Int. Cl.⁶ ........................................... G06G 7/02
[52] U.S. Cl. ........................................... 364/825
[58] Field of Search ........................ 364/825, 607, 364/724.01, 851, 602

[56] References Cited

U.S. PATENT DOCUMENTS 4,509,135  4/1985  Parker ........................... 364/851 X

*Primary Examiner*—Tan V. Mai
*Attorney, Agent, or Firm*—Townsend and Towsend and Crew LLP; Kenneth R. Allen

[57] ABSTRACT

A data filter consists of an electronic circuit with a delay and offset in a feedback loop to a reference input of a comparator to provide low frequency tracking of a binary-level data signal so digital information can be extracted at the output of the comparator by causing the reference input to track a relatively slowly-varying baseband neutral signal level. The delay is preferably implemented by a low-pass filter, providing additional noise immunity.

13 Claims, 2 Drawing Sheets

MEHTOD AND APPARATUS FOR RECOVERING DIGITAL DATA FROM BASEBAND ANALOG SIGNAL

BACKGROUND OF THE INVENTION

This invention relates to digital data recovery from an analog telecommunications signal of nominally binary levels. In particular, the invention relates to a circuit conventionally referred to as a data filter.

Extracting binary-level (digital) data from a telecommunications signal which contains data-level excursions of a few hundred millivolts is done by examining the output of a discriminator and generating a filtered bi-level signal having large excursions using a comparator. It has been discovered that the conventional prior art data filter approach, as shown in the data filter circuit 10 in FIG. 1, is inadequate in the presence of high bias and/or low-frequency bias drift on the discriminator signal. Various approaches have included the use of a comparator-based data filter, as shown in FIG. 1, and the use of a peak detector without feedback.

The peak detector approach does not examine for actual data levels. Rather, it examines for peaks using two associated time constants: a very fast time constant on attack, which is needed in order to follow the peaks, and a very slow time constant on relaxation in order to follow the level of the peak signal. The cutoff frequency on the slow time constant needs to be an order of magnitude lower than is desired in contemplated applications. The cutoff frequency on the fast time constant needs to be an order of magnitude higher than is desired in contemplated applications.

In the prior art data tracking/comparator approach illustrated in FIG. 1, an input data signal of nominally binary level deviation is provided at input 12 via a splitter 14 to the inverting input 16 of a comparator 18 and to a low-pass filter 20, the output of which is fed to the reference input 22 of the comparator 18. The output signal at output 24 of the comparator 18 is a desired binary-level signal substantially free of spurious excursion, and it is typically of levels which are suitable for driving digital circuits such as shift registers and the like. The low-pass filter 20, typically a simple R-C network (capacitive shunt to ground with a resistor in the signal path to establish a time constant and impedance), reduces spurious high-frequency signals and introduces a desired delay in signal applied to the reference input. While the comparator provides unambiguous binary level output, it is subject to spurious noise interference. Unfortunately, under certain conditions, the reference level drifts sufficiently far that the desired noise immunity of the circuit is jeopardized and thus false data values may be propagated through the data filter.

SUMMARY OF THE INVENTION

According to the invention, input binary level data is filtered to binary level data in an electronic circuit with a delay and offset in a feedback loop to a reference input of a comparator provides low frequency tracking of a binary-level data signal so digital information can be extracted at the output of the comparator by causing the reference input to track a relatively slowly-varying baseband neutral signal level. In a preferred embodiment, the delay is implemented by a low-pass filter. The invention provides substantially improved noise immunity as compared with prior art circuits.

The invention will be better understood upon reference to the following detailed description in connection with the accompanying drawings.

DESCRIPTION OF SPECIFIC EMBODIMENTS

Figure 1:
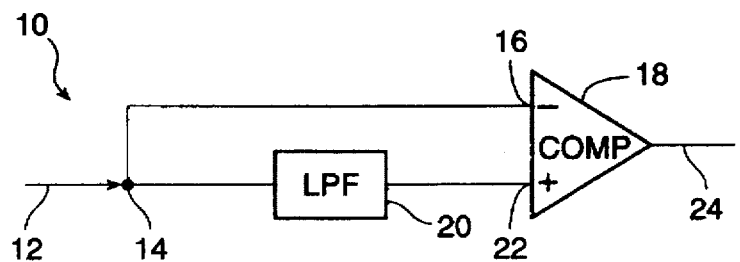
FIG. 1 is a block diagram of a prior art data extraction circuit.
Figure 2:
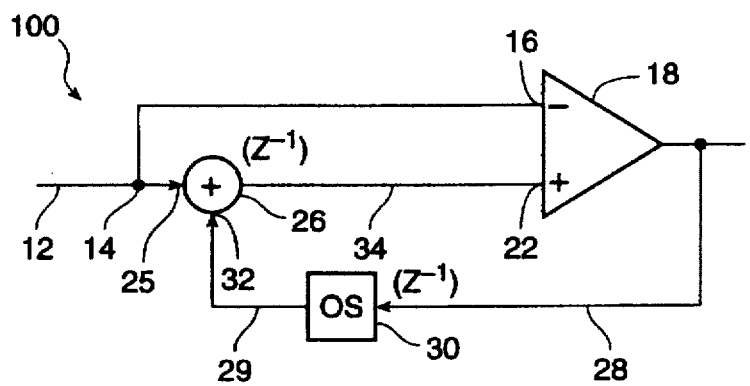
FIG. 2 is a block diagram of a data extraction circuit according to a first embodiment of the invention.
Figure 6:
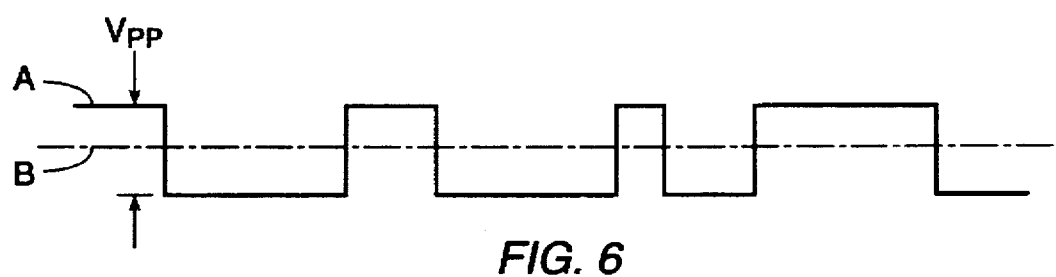
FIG. 6 is a timing diagram for a system input signal and for a comparator reference input signal according to the invention.

FIG. 2 is a block diagram of a data extraction circuit 100 according to a first embodiment of the invention. The input data signal of nominally binary level deviation, as shown in FIG. 6 as signal level A about a nominal reference level B with a peak-to-peak voltage $V_{pp}$, is provided at input 12 via a splitter 14 to the inverting input 16 of a comparator 18 and to a first input 25 of a summer 26. The output of the summer 26 is fed to the reference input 22 of the comparator 18. The output signal at output 24 of the comparator 18 is the desired binary-level digital output signal. According to the invention, the output 24 is fed back via feedback path 28 through a level offsetting circuit 30, and its output on path 29 is fed to second input 32 of the summer 26. The summed output on path 34 is fed to reference input 22, as noted above, with a signal value corresponding to signal level B in FIG. 6.

The signal in the feedback path must, according to the invention, deviate in the opposite direction to the direction of deviation of the input signal at the inverting input 16. Thus, if the level at input 16 is more positive than the level at input 22, the excursion on feedback path 28 is negative, subtracting from the level signal applied at the first summer input 25.

Figure 5:
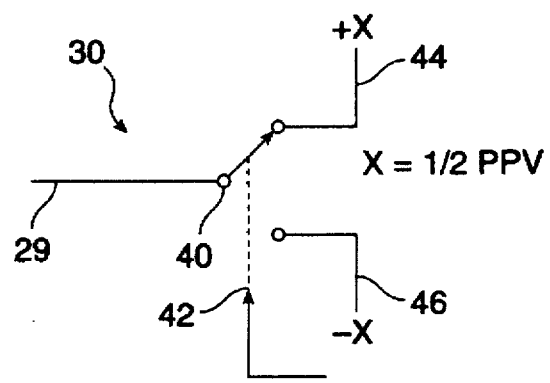
FIG. 5 is a schematic diagram of an offset circuit according to one embodiment of the invention.

The level offsetting circuit 30 level offsetting circuit is operative to transform a true-valued signal to a positive-valued signal and a not-true-valued signal to a negative-valued signal. Preferably the offsetting circuit is a voltage converter for converting a positive signal to a positive level which is offset in a range of greater than zero volts to a positive peak-to-peak input level voltage and for converting a nominally zero voltage signal to a negative level which is offset in a range of less than zero volts to a negative peak-to-peak input level voltage. The range $V_{pp}$ (FIG. 6) illustrates this voltage office and deviation. The level offsetting circuit 30, may be, in applications not requiring highest precision or highest noise immunity, as simple as a resistor in series in the feedback path. The resistor serves to attenuate, or offset, the magnitude of the feedback voltage to the summer. In a more specific embodiment, the level offsetting circuit 30 is a voltage converter, as shown in FIG. 5. The circuit 30 comprises a single pole, double throw (solid state) switch 40 which selects, under input control 42 on feedback path 28 between two signal levels: when the control signal on feedback path 28 is nominal zero volts, it selects a voltage 46 placed on path 29 at a positive reference level which is offset at about a positive one-half of a peak-to-peak voltage level; when the control signal input on path 28 is at a nominally zero voltage signal or is a slightly negative level, it selects a negative voltage 46 for path 29 with a level which is offset at about one-half of the peak-to-peak voltage level. This bias is selected so that at the steady state signal level B (FIG. 6) is virtually constantly exactly half-way between the peak-to-peak discriminator input level excursions (signal A) for all signal input levels, and for drift in the bias of the nominal neutral signal levels.

Figure 3:
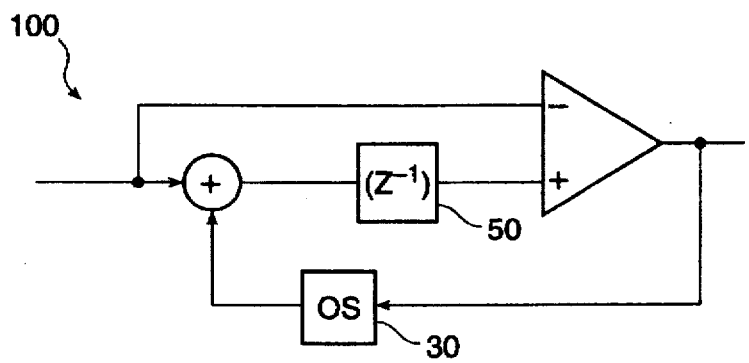
FIG. 3 is a block diagram of a data extraction circuit according to a second embodiment of the invention.

In order for the circuit to operate properly dynamically, at least at startup, there needs to be a slight delay between the application of signal at the signal input 16 and the application of a reference at the reference input 22. In real-world circuits, there is inherently a delay if there is any capacitive element in the feedback path. These delays are identified as "$Z^{-1}$" elements. In FIG. 2, it is assumed that the delay is inherent. In FIG. 3, there is an explicit delay element 50 in an embodiment otherwise substantially identical to FIG. 2 in schematic form. One implementation is an analog signal shift register, such as a CCD bucket brigade.

Figure 4:
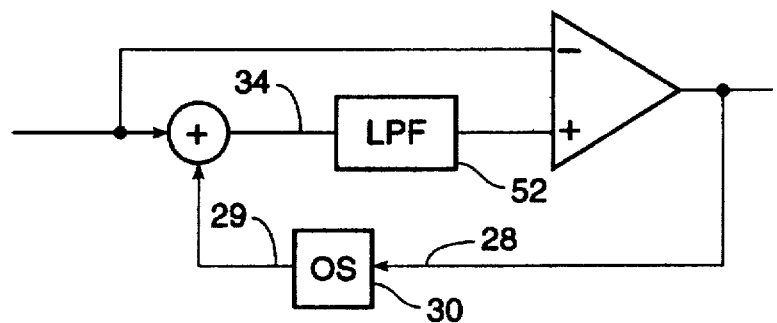
FIG. 4 is a block diagram of a data extraction circuit according to a third embodiment of the invention.

FIG. 4 is illustrative of a preferred embodiment of the invention. Herein a low-pass filter 52 is provided in the reference signal path. Not only does the low-pass filter 52 introduce a delay into the reference signal path 34 and feedback path 28, 29, it provides desirable signal conditioning. The time constant of the low-pass filter is selected to be short enough to track low-frequency deviations of the input binary level data signal and sufficiently long to suppress spurious high-frequency noise on the input binary level data signal. Thus, the high frequency noise which impinges on the noise margin is filtered out and the circuit tracks deviations in the nominal neutral or mid-point signal level of the binary-level signal. For a data rate of 100 KBPS (binary level), a suitable time constant is about 50 microseconds. The low-pass filter 50 can be realized with a simple one-pole filter consisting of a series resistance and a shunt capacitance. Implementation is within the skill of one of ordinary skill in the art.

It has been shown that a data filter circuit according to the invention performs at least as well as known data filter circuits, with substantially improved noise immunity and tracking well within desired tolerances. The invention finds particular application in binary-level data demodulation of wireless telecommunication signals.

The invention has now been explained with reference to specific embodiments. Other embodiments will be apparent to those of ordinary skill in the art. It is therefore not intended that this invention be limited, except as indicated by the appended claims.

What is claimed is:

1. An apparatus for filtering an input data signal of nominally binary levels for use in extracting binary-valued digital data from said input binary level data signal, said apparatus comprising:

a comparator having an inverting data input, a non-inverting reference input and a data output, said inverting data input for receiving said input binary level data signal;

a summer adapted to receive at a first input said input binary level data signal and coupled to receive at a second input a feedback signal, for summing said input binary level data signal and said feedback signal;

a level offsetting circuit coupled to receive said data output signal for producing said feedback signal, said feedback signal being representative of said data output signal at a level offset which results in a nominal signal excursion about a neutral-valued midpoint; and a signal delay means coupled to receive output from said summer, said signal delay means being coupled to said non-inverting reference input of said comparator, wherein said reference signal tracks low frequency deviations in said input binary level data signal.

2. The apparatus according to claim 1 wherein said level offsetting circuit is operative to transform a true-valued signal to a positive-valued signal and a not-true-valued signal to a negative-valued signal.

3. The apparatus according to claim 1 wherein said signal delay means is a low-pass filter.

4. The apparatus according to claim 1 wherein said level offsetting circuit is a voltage converter for converting a positive signal to a positive level which is offset in a range of greater than zero volts to a positive peak-to-peak input level and for converting a nominally zero voltage signal to a negative level which is offset in a range of less than zero volts to a negative peak-to-peak input level.

5. The apparatus according to claim 1 wherein said level offsetting circuit is a voltage converter for converting a positive voltage signal to a positive level which is offset at about a positive one-half of a peak-to-peak input level, and for converting a nominally zero voltage signal to a negative level which is offset at about one-half of a peak-to-peak input level.

6. The apparatus according to claim 1 wherein said signal delay means is a low-pass filter having a time constant sufficiently short to track low-frequency deviations of the input binary level data signal and sufficiently long to suppress spurious high-frequency noise on the input binary level data signal.

7. A method for filtering an input data signal of nominally binary levels for use in extracting binary-valued digital data from said input binary level data signal, said method comprising the steps of:

providing said input binary level data signal to an inverting input of a comparator and to a first summing input of a summer;

tracking a center reference of said input binary level data signal and generating thereby a reference level signal;

offsetting level of a feedback signal from output of said comparator for controlling said tracking; and providing said reference level signal at a non-inverting input of said comparator.

8. The method according to claim 7, wherein said feedback signal offsetting step comprises feeding back output of said comparator at an offset level to a second summing input of said summer for generating a tracking signal.

9. The method according to claim 8 further including the step of conditioning said tracking signal to generate said reference signal.

10. The method according to claim 9 wherein said conditioning comprises adding delay to said tracking signal.

11. The method according to claim 9 wherein said conditioning comprises low-pass filtering said tracking signal to remove high-frequency components and to introduce a tracking delay.

12. The method according to claim 7 wherein said level offsetting comprises converting a positive voltage signal to a positive level which is offset in a range of greater than zero volts to a positive peak-to-peak input level and converting a nominally zero voltage signal to a negative level which is offset in a range of less than zero volts to a negative peak-to-peak input level.

13. The method according to claim 7 wherein said level offsetting comprises converting a positive voltage signal to a positive level which is offset at about a positive one-half of a peak-to-peak input level, and converting a nominally zero voltage signal to a negative level which is offset at about one-half of a peak-to-peak input level.

* * * * *